United States Patent
Tokatyan

(10) Patent No.: US 10,509,974 B2
(45) Date of Patent: Dec. 17, 2019

(54) STAIN AND TRASH DETECTION SYSTEMS AND METHODS

(71) Applicant: Ford Global Technologies, LLC, Dearborn, MI (US)

(72) Inventor: Shant Tokatyan, Foster City, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 134 days.

(21) Appl. No.: 15/494,158

(22) Filed: Apr. 21, 2017

(65) Prior Publication Data
US 2018/0307926 A1    Oct. 25, 2018

(51) Int. Cl.
G06K 9/00 (2006.01)
G06T 5/00 (2006.01)

(52) U.S. Cl.
CPC ..... *G06K 9/00832* (2013.01); *G06K 9/00771* (2013.01); *G06T 5/002* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 5,640,468 A | 6/1997 | Hsu | |
| 6,005,958 A | 12/1999 | Farmer | |
| 6,184,781 B1 | 2/2001 | Sundaram | |
| 6,781,676 B2 | 8/2004 | Wallace | |
| 7,027,054 B1 | 4/2006 | Cheiky | |
| 7,027,621 B1 | 4/2006 | Prokoski | |
| 7,262,696 B2 | 8/2007 | Aota | |
| 7,596,242 B2 | 9/2009 | Breed | |
| 8,098,302 B2 * | 1/2012 | Fukuda | H04N 5/2171 348/14.12 |
| 8,416,397 B2 | 4/2013 | Balzer | |
| 8,611,598 B2 | 12/2013 | Yankun | |
| 8,933,797 B2 | 1/2015 | Jorg | |
| 9,128,185 B2 | 9/2015 | Zeng | |

(Continued)

FOREIGN PATENT DOCUMENTS

| | | |
|---|---|---|
| CN | 202422205 U | 9/2012 |
| CN | 202448860 U | 9/2012 |

(Continued)

OTHER PUBLICATIONS

Track Buses in Real Time with SBU Smart Transit, SBU Happenings, Mar. 16, 2012.

(Continued)

*Primary Examiner* — Maria E Vazquez Colon
(74) *Attorney, Agent, or Firm* — David R. Stevens; Stevens Law Group

(57) ABSTRACT

Example stain and trash detection systems and methods are described. In one implementation, a method receives a clean image of a vehicle interior and a second image of the vehicle interior after a passenger has occupied the vehicle. The method quantizes the clean image and the second image to reduce noise and identifies differences between the clean image and the second image. Additionally, the method identifies at least one contour in the identified differences and classifies an area defined by the contour as one of a stain, dirt, trash, or another item.

12 Claims, 6 Drawing Sheets

(56) References Cited

U.S. PATENT DOCUMENTS

| | | |
|---|---|---|
| 9,444,770 B1 | 9/2016 | Ledet |
| 9,488,982 B2 | 11/2016 | Gurin |
| 9,734,572 B2 | 8/2017 | Tien |
| 9,760,827 B1 | 9/2017 | Lin |
| 2001/0002936 A1 | 6/2001 | Tsuji |
| 2003/0137593 A1 | 7/2003 | Watanabe |
| 2003/0138133 A1 | 7/2003 | Nagaoka |
| 2004/0017579 A1* | 1/2004 | Lim ................. H04N 1/40062 358/1.9 |
| 2004/0245467 A1 | 12/2004 | Lannestedt |
| 2005/0024494 A1 | 2/2005 | Hirota |
| 2005/0131625 A1 | 6/2005 | Birger |
| 2005/0276464 A1 | 12/2005 | Duquette |
| 2006/0091310 A1 | 5/2006 | Furry |
| 2008/0036580 A1 | 2/2008 | Breed |
| 2009/0039255 A1 | 2/2009 | Andrews et al. |
| 2009/0040778 A1 | 2/2009 | Takayanagi |
| 2009/0208083 A1 | 8/2009 | Hayes |
| 2010/0124074 A1 | 5/2010 | Byrchell |
| 2011/0164823 A1* | 7/2011 | Park ..................... G06T 7/12 382/199 |
| 2013/0010096 A1 | 1/2013 | Chidanand |
| 2014/0002658 A1 | 1/2014 | Kim |
| 2014/0133736 A1 | 5/2014 | Tien |
| 2014/0160434 A1 | 6/2014 | Brown |
| 2014/0163329 A1 | 6/2014 | Brown |
| 2015/0116315 A1* | 4/2015 | Takemoto ............... G06T 15/00 345/419 |
| 2015/0199619 A1 | 7/2015 | Ichinose |
| 2015/0213299 A1 | 7/2015 | Ferrandez |
| 2015/0323388 A1 | 11/2015 | Kostic |
| 2016/0078576 A1 | 3/2016 | Su |
| 2016/0140392 A1* | 5/2016 | Gurbuz ............. G06K 9/00624 382/103 |
| 2016/0328976 A1 | 11/2016 | Jo |
| 2016/0332535 A1 | 11/2016 | Bradley |
| 2017/0091559 A1 | 3/2017 | Hurtado |
| 2017/0136842 A1 | 5/2017 | Anderson |
| 2017/0174180 A1 | 6/2017 | Floyas |
| 2017/0210352 A1 | 7/2017 | Stauffer |
| 2017/0210353 A1* | 7/2017 | Stauffer ................. H04W 4/70 |
| 2017/0267251 A1 | 9/2017 | Roberts |
| 2017/0291539 A1 | 10/2017 | Avery |
| 2017/0291548 A1 | 10/2017 | Kim |
| 2017/0330044 A1 | 11/2017 | Telpaz |
| 2017/0353681 A1 | 12/2017 | Mochizuki |
| 2018/0022358 A1 | 1/2018 | Fung |
| 2018/0112173 A1* | 4/2018 | Wiles ..................... C12M 41/36 |

FOREIGN PATENT DOCUMENTS

| | | | |
|---|---|---|---|
| CN | 202871022 U | 4/2013 | |
| CN | 203224912 U | 10/2013 | |
| CN | 104597857 A | 5/2015 | |
| CN | 104601937 A | 5/2015 | |
| DE | 102012007559 A1 | 11/2012 | |
| DE | 102013001332 A1 * | 7/2014 | ............ G01N 21/94 |
| GB | 2543161 | 4/2017 | |
| GB | 2549615 | 10/2017 | |
| GB | 2558722 | 7/2018 | |
| JP | H06273255 A | 9/1994 | |
| JP | H0973529 A | 3/1997 | |
| JP | 2000020686 A | 1/2000 | |
| JP | 2011105415 A | 6/2011 | |
| KR | 101717613 B1 | 3/2017 | |
| WO | WO-2005001409 A2 | 1/2005 | |
| WO | WO2015025435 | 2/2015 | |

OTHER PUBLICATIONS

2012 Fur Systems, Inc. Specifications are subject to change without notice, check our website: www.flir.com/Maritime. 1005-398 v.2.

* cited by examiner

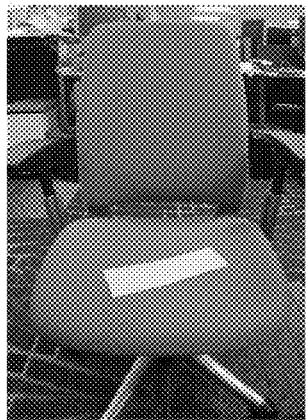 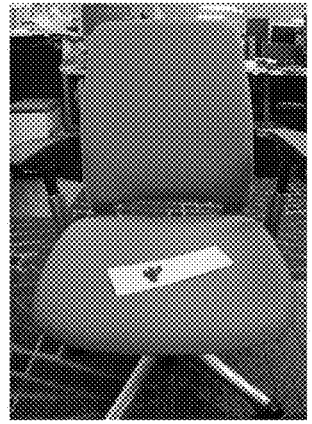 
FIG. 5A     FIG. 5B     FIG. 5C
  
FIG. 6A     FIG. 6B     FIG. 6C

STAIN AND TRASH DETECTION SYSTEMS AND METHODS

TECHNICAL FIELD

The present disclosure relates to vehicular systems and, more particularly, to systems and methods that detect stains and trash within a vehicle.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. An example application of autonomous vehicles is operating as a taxi or shuttle service that picks up one or more passengers in response to a transportation request. When operating as a taxi or shuttle service, the autonomous vehicle drives to a pickup location such that a passenger requesting the service can enter the vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 5A-5C illustrate embodiments of example images used to detect stains in a vehicle.

FIGS. 6A-6C illustrate embodiments of example images used to detect trash in a vehicle.

DETAILED DESCRIPTION

Figure 1:
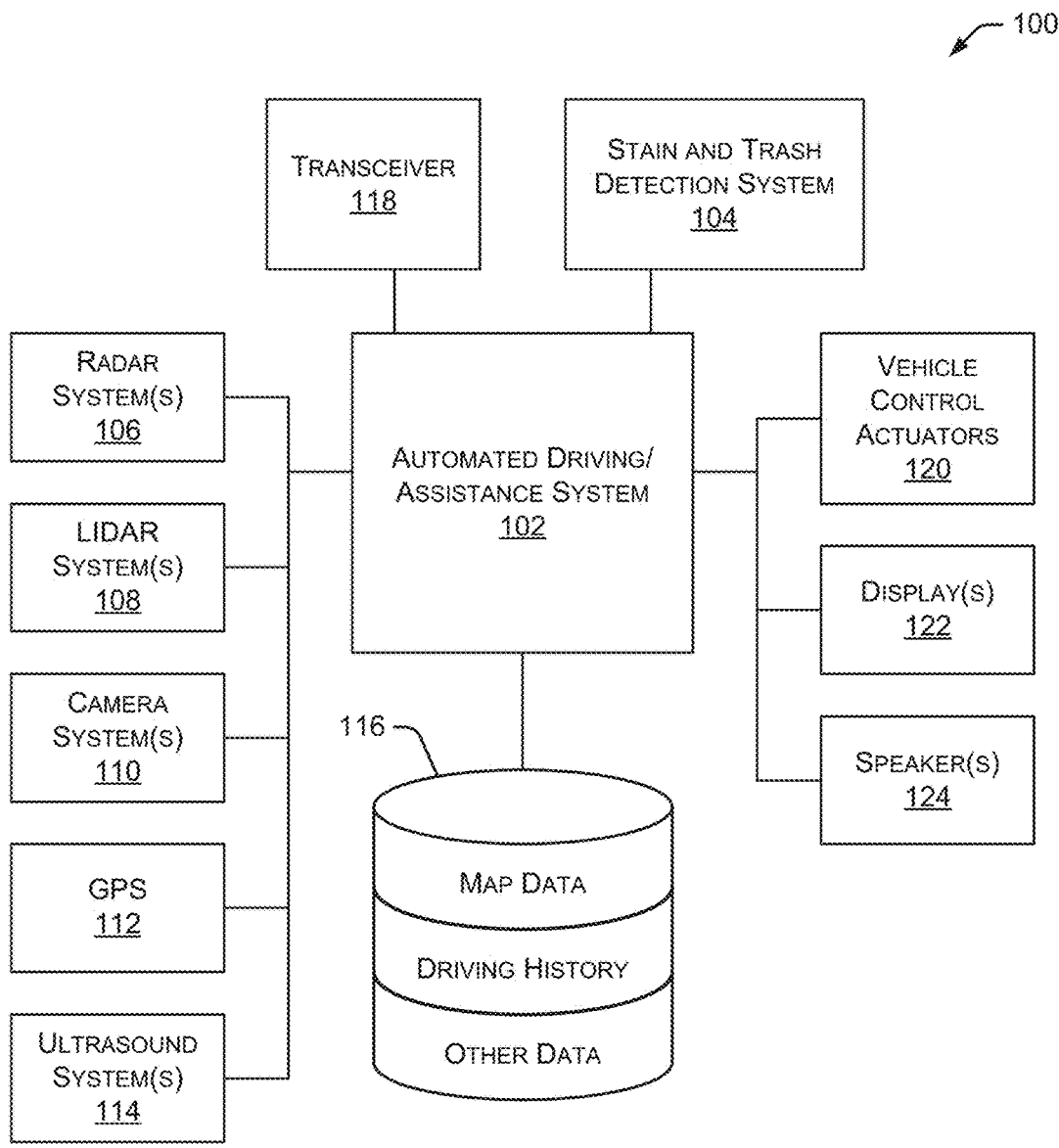
FIG. 1 is a block diagram illustrating an embodiment of a vehicle control system that includes a stain and trash detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes a stain and trash detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes obstacle detection system 104 that interacts with various components in the vehicle control system to detect and respond to potential (or likely) obstacles located near the vehicle (e.g., in the path of the vehicle). In one embodiment, stain and trash detection system 104 detects stains, dirt, trash, and other items inside the vehicle. Although stain and trash detection system 104 is shown as a separate component in FIG. 1, in alternate embodiments, stain and trash detection system 104 may be incorporated into automated driving/assistance system 102 or any other vehicle component.

The vehicle control system 100 also includes one or more sensor systems/devices for detecting a presence of nearby objects (or obstacles) or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that the automated driving/assistance system 102 can assist a driver or drive a vehicle in real-time.

Figure 2:
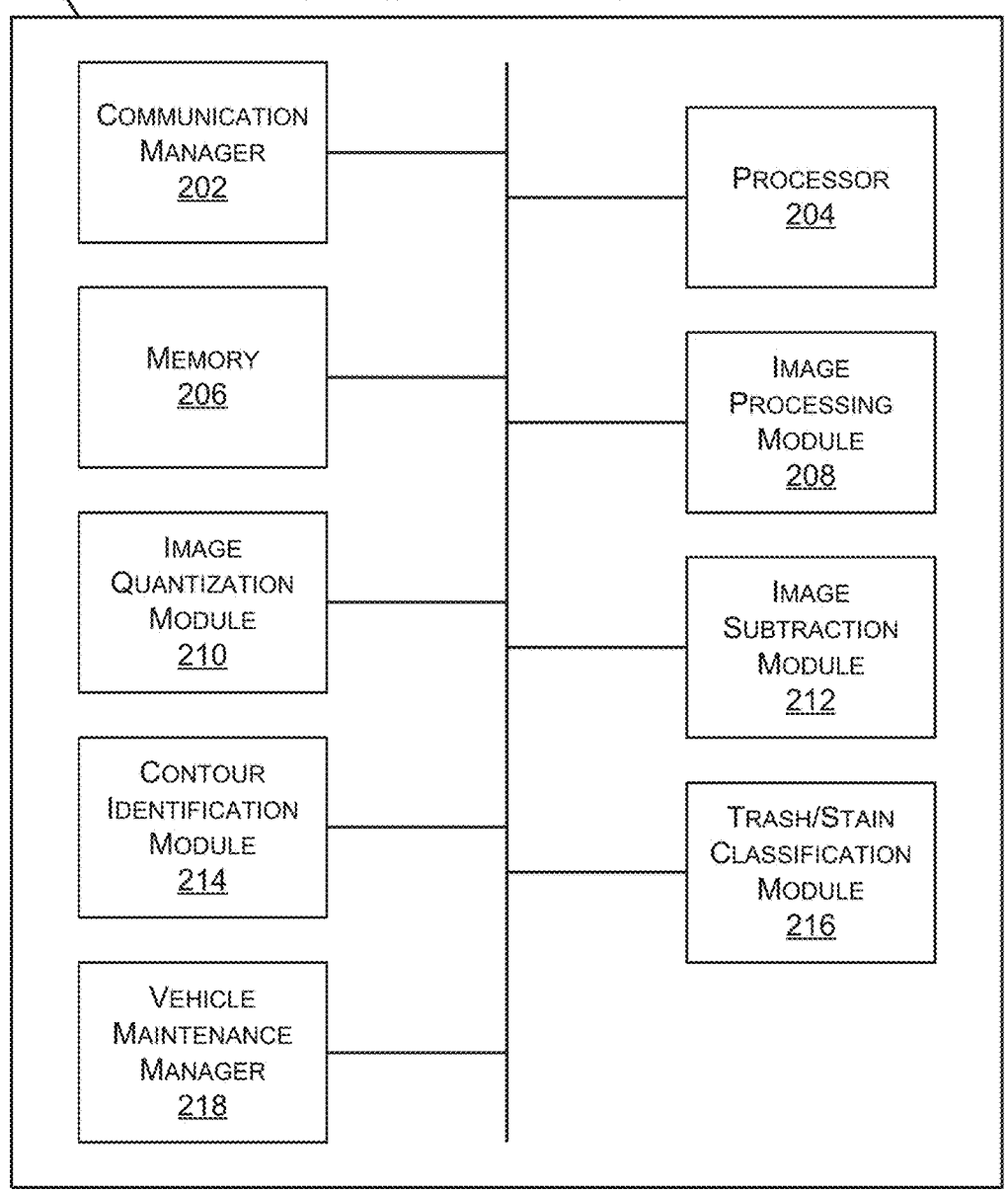
FIG. 2 is a block diagram illustrating an embodiment of a stain and trash detection system.

FIG. 2 is a block diagram illustrating an embodiment of stain and trash detection system 104. As shown in FIG. 2, stain and trash detection system 104 includes a communication manager 202, a processor 204, and a memory 206. Communication manager 202 allows stain and trash detection system 104 to communicate with other systems, such as automated driving/assistance system 102. Processor 204 executes various instructions to implement the functionality provided by stain and trash detection system 104, as discussed herein. Memory 206 stores these instructions as well as other data used by processor 204 and other modules and components contained in stain and trash detection system 104.

Additionally, stain and trash detection system 104 includes an image processing module 208 that receives image data from one or more camera systems 110. In some embodiments, image processing module 208 includes an image management algorithm or process that manages one or more clean images that represent images of the vehicle interior when it is clean (e.g., no stains, dirt, trash, or other items in the vehicle). Additionally, image processing module 208 may manage one or more additional images that are captured after a passenger has exited the vehicle. As discussed herein, these additional images are compared to the clean images to determine whether the vehicle interior has a stain, trash, or other item as a result of the passenger traveling in the vehicle.

An image quantization module 210 is capable of quantizing both clean images and additional images to reduce noise in the images. When quantizing the images, the image quantization module 210 reduces the color spectrums of the images to three shades of gray, which helps to reduce noise in the images. In some embodiments, quantization is also referred to as "n-color gray scaling." For example, image quantization module 210 may implement the techniques disclosed in U.S. application Ser. No. 15/360,856, filed Nov. 23, 2016, and entitled "Detection of lane-splitting motorcycles", which is hereby incorporated herein in its entirety. U.S. application Ser. No. 15/360,856 discloses the following approach:

> For example, for an image frame having a possible 256 intensity levels, step 406 may include converting the pixels in the region of interest to one of 10, preferably less than 5, and more preferably only three levels (e.g., black, gray, and white). For example, the 256 intensity levels may be divided into a high (255-170), middle, (169-85) and low region (85-0). Pixels having intensities in the high region may be assigned a high level (e.g., white), pixels having intensities in the middle region may be assigned a middle level (e.g., gray), and pixels having intensities in the low region may be assigned a low level (e.g., black). In this example, the range of possible intensities may be of substantially (e.g. within 1%) equal size. However, the regions may be of unequal size in other embodiments (paragraphs 36 and 37).

Stain and trash detection system 104 also includes an image subtraction module 212 that subtracts the additional images from the clean images to identify differences between the photos. These differences may represent stains, dirt, trash, or other items left behind by the previous passenger. For example, image subtraction module 212 may implement the techniques disclosed in U.S. application Ser. No. 15/360,856, filed Nov. 23, 2016, and entitled "Detection of lane-splitting motorcycles", which is hereby incorporated herein in its entirety.

A contour identification module 214 identifies one or more contours in the differences between the clean images and the additional images, as identified by image subtraction module 212. The contours include, for example, the outline of stains, dirt, pieces of trash, or other items, such as items left behind by the previous passenger. Contour identification module 214 also defines a bounding box around each contour. The bounding box allows a user or computing system to easily identify the identified contours. Additionally, based on the placement and angle of the camera that captured each image, stain and trash detection system 104 can map the bounding box to a particular location in the vehicle.

A trash/stain classification module 216 detects locations and types of stains, dirt, trash, and other items in the vehicle. For example, trash/stain classification module 216 analyzes the identified contours which indicate the presence of a new object. The new object is classified by analyzing the shape of the contour as well as the smoothness of the contour edges. For example, if the contour is substantially round with smooth edges, it is likely a stain. Alternatively, if the contour has an irregular shape and/or sharp/jagged edges, it is more likely to be a piece of trash or other item left in the vehicle by the previous passenger.

In some embodiments, trash/stain classification module 216 accesses a data source (e.g., a database or lookup table) containing information associated with previously classified contours, such as the shape and edge characteristics of each contour and the resulting classification of each contour. That information associated with previously classified contours may be used by trash/stain classification module 216 to analyze and classify future contours, such as identifying a previously classified contour in the data source that is a close match to a current contour being classified. A close match allows trash/stain classification module 216 to make assumptions regarding the classification of the contour.

A vehicle maintenance manager 218 manages the cleaning and maintenance of the vehicle. For example, if a stain, dirt, trash, or other item is detected in the vehicle after a passenger has exited the vehicle, vehicle maintenance manager 218 may determine whether the vehicle needs to be removed from service before accepting the next passenger. If cleaning is required, vehicle maintenance manager 218 may instruct automated driving/assistance system 102 to drive the vehicle to the nearest cleaning or service facility.

Figure 3:
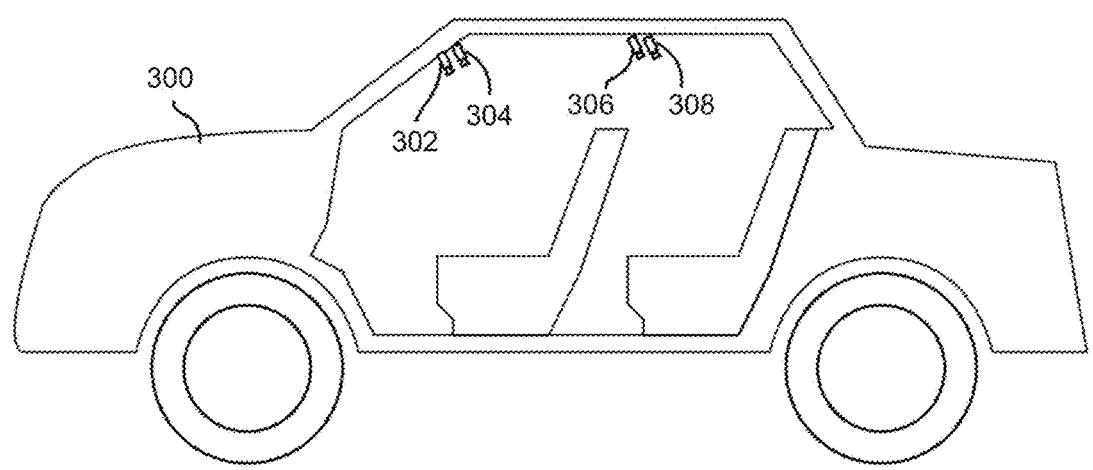
FIG. 3 illustrates an embodiment of a vehicle with multiple interior cameras.

FIG. 3 illustrates an embodiment of a vehicle 300 with multiple interior cameras. As shown in FIG. 3, vehicle 300 has four interior cameras 302, 304, 306, and 308. In some embodiments, cameras 302-308 are positioned and oriented in vehicle 300 such that all seating surfaces (e.g., seat bottoms and seat backs) are in the field of view of at least one camera 302-308. Other areas of the interior of vehicle 300 may also be in the field of view of one or more cameras 302-308. In the configuration of vehicle 300, cameras 302 and 304 are positioned and oriented to capture images of seating surfaces of the front seats of the vehicle. Similarly, cameras 306 and 308 are positioned and oriented to capture images of seating surfaces of the rear seats of the vehicle. Although four interior cameras 302-308 are shown in FIG. 3, in alternate embodiments, vehicle 300 may have any number of interior cameras in various locations and aimed at different angles.

Figure 4A:
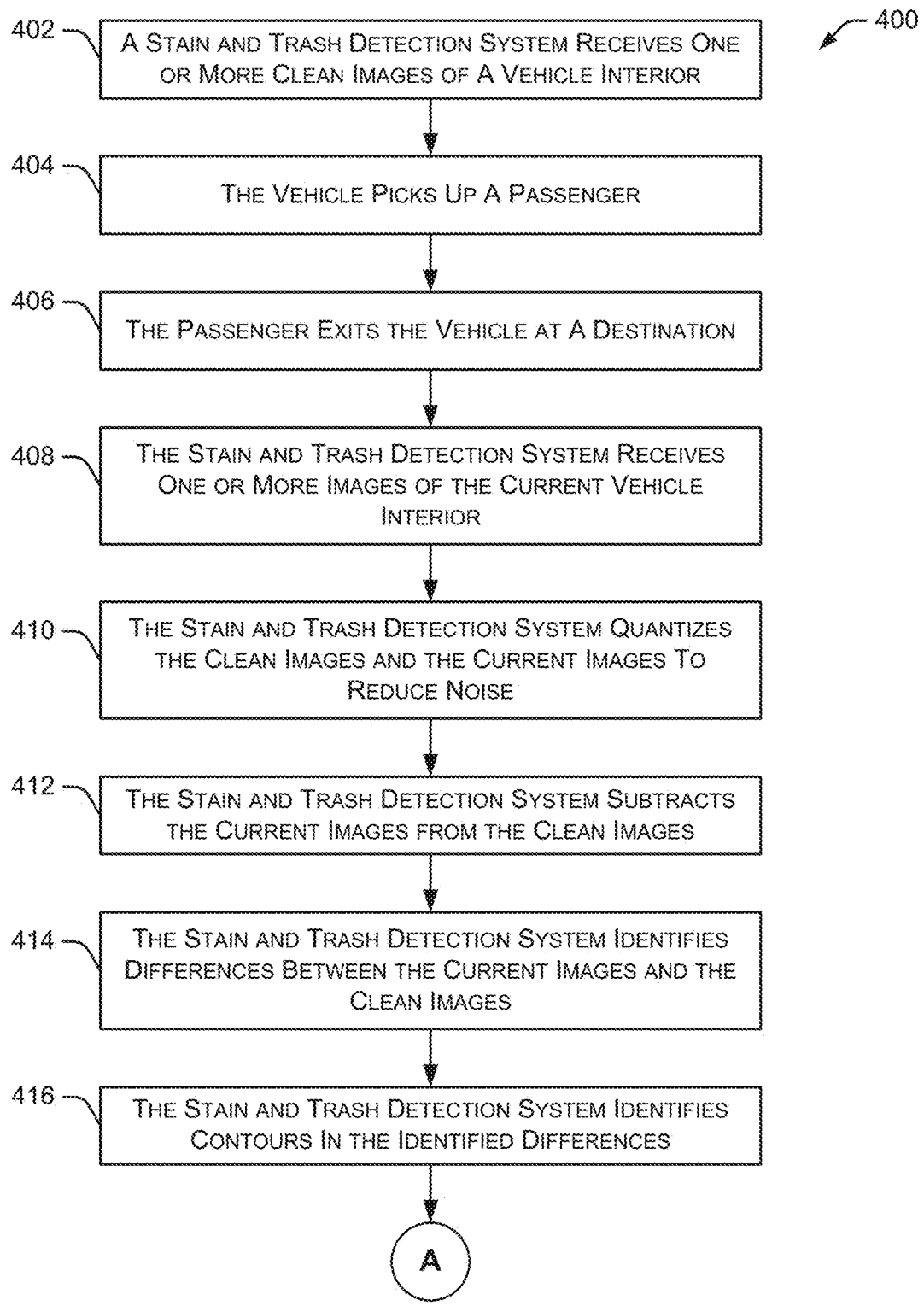
FIGS. 4A and 4B illustrate an embodiment of a method for detecting stains and trash in a vehicle.
Figure 4B:
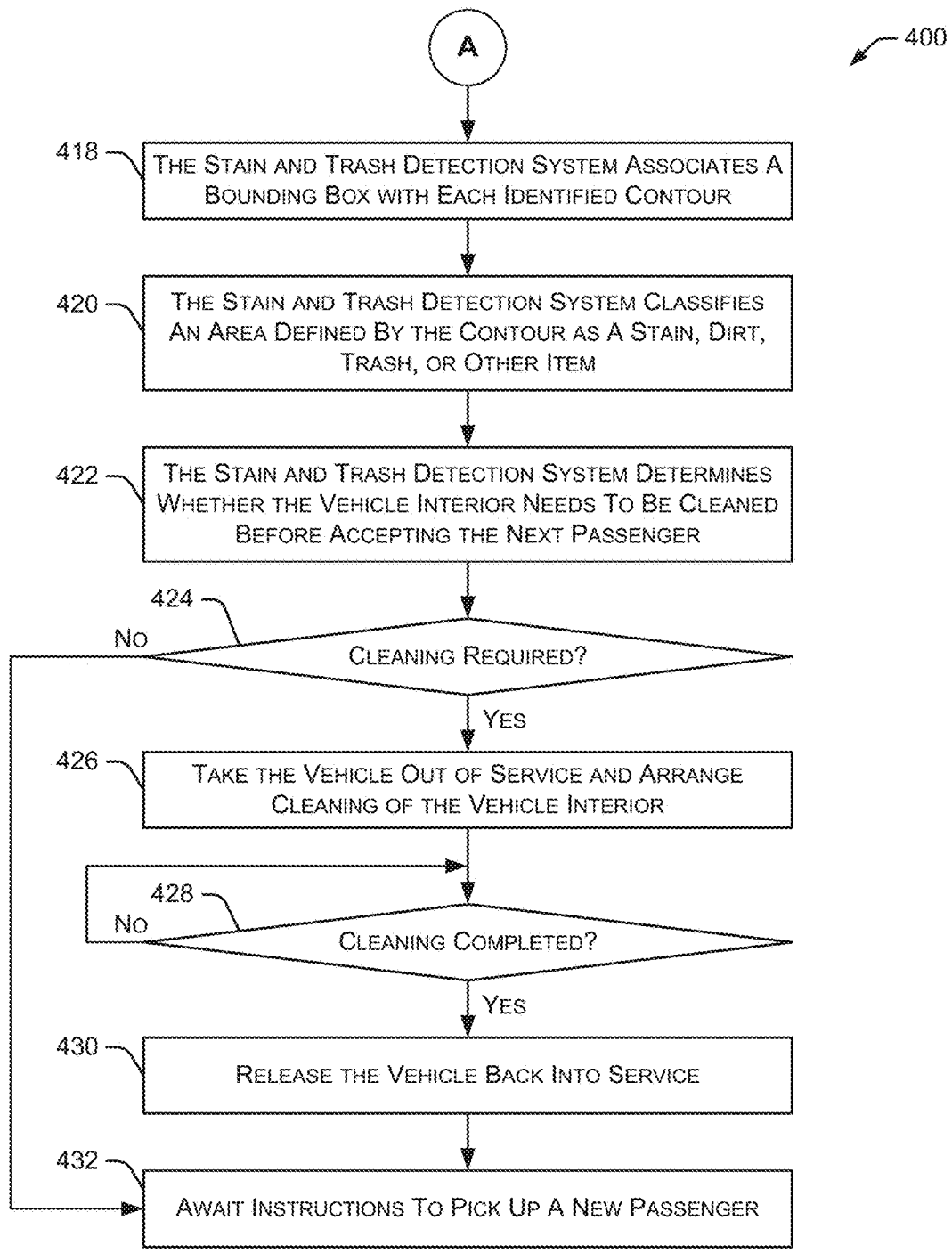

FIGS. 4A and 4B illustrate an embodiment of a method 400 for detecting stains and trash in a vehicle. Initially, a stain and trash detection system receives 402 one or more clean images of a vehicle interior. These clean images may be considered "reference images" and represent a clean vehicle interior. In some embodiments, the vehicle interior should be substantially similar to the clean images before picking up a passenger for transport. In response to a transportation request (or other instruction), the vehicle picks up 404 a passenger and transports the passenger to a destination. The passenger exits 406 the vehicle at the destination.

After the passenger exits 406 the vehicle, the stain and trash detection system receives 408 one or more images of the current vehicle interior (i.e., "current images"). In some embodiments, the location and position from which the current images are take is substantially similar the location and position from which the clean images were taken. The stain and trash detection system quantizes 410 the clean images and the current images to reduce noise. Method 400 continues as the stain and trash detection system subtracts 412 the current images from the clean images. In some embodiments, the stain and trash detection system subtracts 412 each current image from a corresponding clean image (e.g., clean images of the same portion of the vehicle interior).

The stain and trash detection system then identifies 414 differences between the current images and the clean images. As discussed herein, these differences may represent stains, dirt, trash, or other items left behind by the previous passenger. The stain and trash detection system identifies 416 contours in the identified differences. The contours may represent, for example, the outline of stains, dirt, pieces of trash, or other items.

As method 400 continues, the stain and trash detection system associates 418 a bounding box with each identified contour. As noted above, the bounding box allows a user or computing system to easily identify the identified contours. And, based on the placement and angle of the camera that captured each image, the stain and trash detection system can map the bounding box to a particular location in the vehicle. Thus, the bounding box can assist cleaning personnel or self-cleaning systems in locating the specific stains, dirt, pieces of trash, or other items.

The stain and trash detection system classifies 420 an area defined by the contour as a stain, dirt, trash, or other item. As discussed herein, the area defined by a contour can be classified by analyzing the shape of the contour as well as the smoothness of the contour edges. For example, if the contour is substantially round with smooth edges, it is likely a stain. However, if the contour has an irregular shape and/or has sharp/jagged edges, it is more likely to be a piece of trash or other item left in the vehicle by the previous passenger. As noted above, in some embodiments, trash/stain classification module 216 may access a data source containing information associated with previously classified contours. This additional information is useful to analyze and classify contours, such as identifying a previously classified contour in the data source that is a close match to a current contour being classified.

The stain and trash detection system determines 422 whether the vehicle interior needs to be cleaned before accepting the next passenger. For example, if the stain and trash detection system identifies a significant stain or piece of trash left by the previous passenger, the vehicle may need to be cleaned before accepting another passenger. Additionally, if the vehicle needs to be cleaned, the determination 422 may include the type of cleaning needed. For example, a small piece of trash can be easily removed by a robot, an automated cleaning system, or an individual user located near the vehicle. However, if a significant stain or a large amount of dirt is detected, the vehicle may require a more thorough cleaning at a vehicle service center or performed by a mobile cleaning service. If cleaning is not required, the vehicle awaits instructions 432 to pick up a new passenger in response to a new transportation request.

If cleaning is required 424, the vehicle may be taken out of service 426 while a cleaning service is arranged and the vehicle interior cleaning is performed. When the vehicle cleaning is completed 428, the vehicle is released back into service 430 and is available to accept new transportation requests. The vehicle then awaits instructions 432 to pick up a new passenger in response to a new transportation request.

FIGS. 5A-5C illustrate embodiments of example images used to detect stains in a vehicle. For example, FIG. 5A illustrates a clean image of a seating surface with a clean napkin. FIG. 5B illustrates the same seating surface and the same napkin, but the napkin has a stain. As discussed herein, FIG. 5B is a "second image" after a passenger has exited the vehicle. FIG. 5C illustrates the result of the image processing discussed herein which identifies the differences between the clean image and the second image. As shown in FIG. 5C, the dense concentration of white pixels identifies the stain on the napkin.

FIGS. 6A-6C illustrate embodiments of example images used to detect trash in a vehicle. For example, FIG. 6A illustrates a clean image of a seating surface. FIG. 6B illustrates the same seating surface, but with two pieces of trash present on the seating surface. As discussed herein, FIG. 6B is a "second image" after a passenger has exited the vehicle. FIG. 6C illustrates the result of the image processing discussed herein which identifies the differences between the clean image and the second image. As shown in FIG. 6C, the two areas with dense concentrations of white pixels identify the two pieces of trash.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving a clean image of a vehicle interior of a vehicle;
receiving a second image of the vehicle interior after a passenger has occupied the vehicle;
quantizing the clean image and the second image to reduce noise by reducing pixels of the clean image and the second image to three levels including one black level, one gray level, and one white level according to intensity of the pixels to obtain a quantized clean image and a quantized second image;
identifying differences between the quantized clean image and the quantized second image;
identifying a contour in the identified differences; and
classifying an area defined by the contour as one of a stain, dirt, trash, or another item;
wherein the vehicle is an autonomous vehicle;
wherein the intensities of the pixels of the clean image and the second image have a first range of values; and
wherein quantizing the clean image and the second image to reduce noise comprises:
replacing pixels in the clean image and the second image having intensities in a second range of values with the one white level;
replacing pixels in the clean image and the second image having intensities in a third range of values with the one gray level; and
replacing pixels in the clean image and the second image having intensities in a fourth range of values with the one black level; and
wherein the second range of values is higher than the third range of values and the third range of values is higher than the fourth range of values.

2. The method of claim 1, further comprising associating a bounding box with the contour.

3. The method of claim 1 wherein identifying differences between the quantized clean image and the quantized second image includes subtracting the quantized second image from the quantized clean image.

4. The method of claim 1, wherein classifying the area defined by the contour includes determining a shape of the contour.

5. The method of claim 1, wherein classifying the area defined by the contour includes determining a smoothness of edges of the contour.

6. The method of claim 1, further comprising determining whether the vehicle interior needs to be cleaned based on the classification of the area defined by the contour.

7. The method of claim 6, further comprising taking the vehicle out of service if the vehicle interior needs to be cleaned.

8. The method of claim 6, further comprising, responsive to determining that the vehicle interior needs to be cleaned, arranging cleaning of the vehicle interior.

9. The method of claim 6, further comprising awaiting instructions to pick up a new passenger if the vehicle interior does not need to be cleaned.

10. An apparatus comprising:
    a communication manager configured to receive a clean image of a vehicle interior of a vehicle and configured to receive a second image of the vehicle interior after a passenger has occupied the vehicle;
    an image quantization module configured to quantize the clean image and the second image by reducing pixels of the clean image and the second image to three levels including one black level, one gray level, and one white level according to intensity of the pixels to obtained a quantized clean image and a quantized second image;
    an image processing module configured to identify differences between the quantized clean image and the quantized second image;
    a contour identification module configured to identify a contour in the identified differences; and
    a classification module configured to classify an area defined by the contour as one of a stain, dirt, trash, or another item
    wherein the image quantization module is configured to quantize the clean image and the second image by:
    replacing pixels in the clean image and the second image having intensities in a first range of values with the one white level;
    replacing pixels in the clean image and the second image having intensities in a second range of values with the one gray level; and
    replacing pixels in the clean image and the second image having intensities in a third range of values with the one black level; and
    wherein the first range of values is higher than the second range of values and the second range of values is higher than the third range of values.

11. The apparatus of claim 10, further comprising a vehicle maintenance manager configured to determine whether the vehicle interior needs to be cleaned based on the classification of the area defined by the contour.

12. The apparatus of claim 10, wherein the apparatus is coupled to an automated driving system in the vehicle.

* * * * *